United States Patent
Dhammawat (10) Patent No.: US 9,531,756 B2
(45) Date of Patent: *Dec. 27, 2016

(54) SYSTEM AND METHOD FOR PROVIDING ERROR HANDLING IN AN UNTRUSTED NETWORK ENVIRONMENT

(71) Applicant: CISCO TECHNOLOGY, INC., San Jose, CA (US)

(72) Inventor: Abhishek Dhammawat, Bangalore (IN)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/534,385

(22) Filed: Nov. 6, 2014

(65) Prior Publication Data

US 2016/0127415 A1 May 5, 2016

Related U.S. Application Data

(63) Continuation of application No. 14/528,920, filed on Oct. 30, 2014.

(51) Int. Cl.
*G06F 9/00* (2006.01)
*H04L 29/06* (2006.01)
(Continued)

(52) U.S. Cl.
CPC ............. *H04L 63/20* (2013.01); *H04L 63/061* (2013.01); *H04L 63/0892* (2013.01); *H04W 12/04* (2013.01); *H04W 12/06* (2013.01)

(58) Field of Classification Search
CPC .................................. H04L 63/20; H04L 63/02
(Continued)

(56) References Cited

U.S. PATENT DOCUMENTS 8,613,073 B2 12/2013 McCann
9,332,015 B1 5/2016 Dhammawat
(Continued)

FOREIGN PATENT DOCUMENTS

EP 2400791 A1 12/2011

OTHER PUBLICATIONS

U.S. Appl. No. 14/528,920, filed Oct. 30, 2014, entitled "System and Method for Providing Error Handling in an Untrusted Network Environment"; Inventor: Abhishek Dhammawat.
(Continued)

*Primary Examiner* — Teshome Hailu
(74) *Attorney, Agent, or Firm* — Patent Capital Group (57) ABSTRACT

An example method is provided and may include receiving a DIAMETER-based error over an SWm interface by a first evolved packet data gateway (ePDG) for a user equipment (UE) attempting to connect to the first ePDG; determining an Internet Key Exchange version two (IKEv2) error type corresponding to the DIAMETER-based error; and communicating the IKEv2 error type to the UE over an SWu interface. In some cases, the IKEv2 error type can be included in a notify payload or in a vendor ID payload for an IKE authentication response (IKE_AUTH_RESP) message. By distinguishing the IKEv2 error type, the UE can determine whether the error is a temporary or a permanent type and can determine whether to attempt to connect again to the first ePDG after a period of time or attempt to connect to another ePDG, which can help to reduce unnecessary signaling and provide better connectivity and user experience.

20 Claims, 6 Drawing Sheets

(51) Int. Cl.
*H04W 12/04* (2009.01)
*H04W 12/06* (2009.01)

(58) Field of Classification Search
USPC .......................................................... 726/12
See application file for complete search history.

(56) References Cited

U.S. PATENT DOCUMENTS

| | | | |
|---|---|---|---|
| 2006/0225128 A1 | 10/2006 | Aittola | |
| 2007/0143834 A1 | 6/2007 | Leinonen | |
| 2007/0199049 A1 | 8/2007 | Ziebell | |
| 2008/0104678 A1* | 5/2008 | Hsu | H04L 63/08 726/4 |
| 2008/0162926 A1* | 7/2008 | Xiong | G06F 21/445 713/155 |
| 2009/0210743 A1 | 8/2009 | Gu | |
| 2010/0125899 A1 | 5/2010 | Tinnakornsrisuphap | |
| 2010/0199332 A1 | 8/2010 | Bachmann et al. | |
| 2010/0313023 A1 | 12/2010 | Ren | |
| 2011/0004762 A1 | 1/2011 | Horn | |
| 2011/0035787 A1* | 2/2011 | Naslund | H04L 63/08 726/3 |
| 2011/0216743 A1 | 9/2011 | Bachmann et al. | |
| 2011/0265146 A1 | 10/2011 | He | |
| 2013/0282816 A1* | 10/2013 | Fujita | H04L 67/02 709/204 |
| 2013/0290722 A1 | 10/2013 | Kall et al. | |

OTHER PUBLICATIONS

Calhoun, P., et al., "Diameter Base Protocol," Network Working Group RFC 3588, Sep. 2003, 147 pages; https://tools.ietf.org/html/rfc3588.

Kaufman, C., "Internet Key Exchange Protocol Version 2 (IKEv2)," Network Working Group RFC 5996, Sep. 2010, 138 pgs.; http://www.hjp.at/doc/rfc/rfc5996.html.

USPTO Jan. 15, 2016 Notice of Allowance from U.S. Appl. No. 14/528,920.

* cited by examiner

SYSTEM AND METHOD FOR PROVIDING ERROR HANDLING IN AN UNTRUSTED NETWORK ENVIRONMENT

CROSS-REFERENCE TO RELATED APPLICATION

This application is a continuation (and claims the benefit under 35 U.S.C. §120) of U.S. application Ser. No. 14/528,920 filed Oct. 30, 2014, by Abhishek Dhammawat, entitled "SYSTEM AND METHOD FOR PROVIDING ERROR HANDLING IN AN UNTRUSTED NETWORK ENVIRONMENT." The disclosure of the prior application is considered part of (and is incorporated by reference in) the disclosure of this application in its entirety.

TECHNICAL FIELD

This disclosure relates in general to the field of communications and, more particularly, to a system and method for providing error handling in an untrusted network environment.

BACKGROUND

Networking architectures have grown increasingly complex in communications environments, particularly mobile wireless environments. Mobile communication networks have grown substantially in subscriber base as end users become increasingly connected to mobile wireless environments to conduct business, to shop, to interact with friends, to maintain personal finances, and to perform many other daily functions. As the number of mobile subscribers increases, efficient management of communication resources becomes more critical. In some instances, management of resources depends on service providers efficiently managing untrusted network environments. In some situations, when user equipment fails in establishing a call with an evolved packet data gateway (ePDG) for an untrusted network, then the user equipment repeatedly tries to connect to the ePDG, which can lead to repeated call rejections and unnecessary signaling. Accordingly, there are significant challenges in managing untrusted network environments, particularly with regard to error handling when authentication fails for user equipment attempting to access an evolved packet data gateway (ePDG) in an untrusted network.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

A method is provided in one example embodiment and may include receiving a DIAMETER-based error over an SWm interface by a first evolved packet data gateway (ePDG) for a user equipment (UE) attempting to connect to the first ePDG; determining an Internet Key Exchange version two (IKEv2) error type corresponding to the DIAMETER-based error; and communicating the IKEv2 error type to the UE over an SWu interface between the first ePDG and the UE. In some cases, communicating the IKEv2 error type can include communicating the IKEv2 error type in a notify payload for an IKE authentication response (IKE_AUTH_RESP) message communicated to the UE over the SWu interface. In other cases, communicating the IKEv2 error type can include communicating the IKEv2 error type in a vendor ID payload for an IKE_AUTH_RESP message communicated to the UE over the SWu interface. In such cases, the IKE_AUTH_RESP message can include a notify payload including an AUTHENTICATION_FAILED error type.

In some cases, the DIAMETER-based error can be associated with a temporary type of error, in which case the determined IKEv2 error type can be associated with one or more actions to be performed by the UE including, at least in part, the UE cleaning up its security association (SA) for the first ePDG and attempting to connect to the first ePDG again after a predetermined time interval. In other cases, the DIAMETER-based error can be associated with a permanent type of error, in which case the determined IKEv2 error type can be associated with one or more actions to be performed by the UE including, at least in part, the UE cleaning up its SA for the first ePDG and attempting to connect to a second ePDG before attempting to connect to the first ePDG.

Example Embodiments

Figure 1:
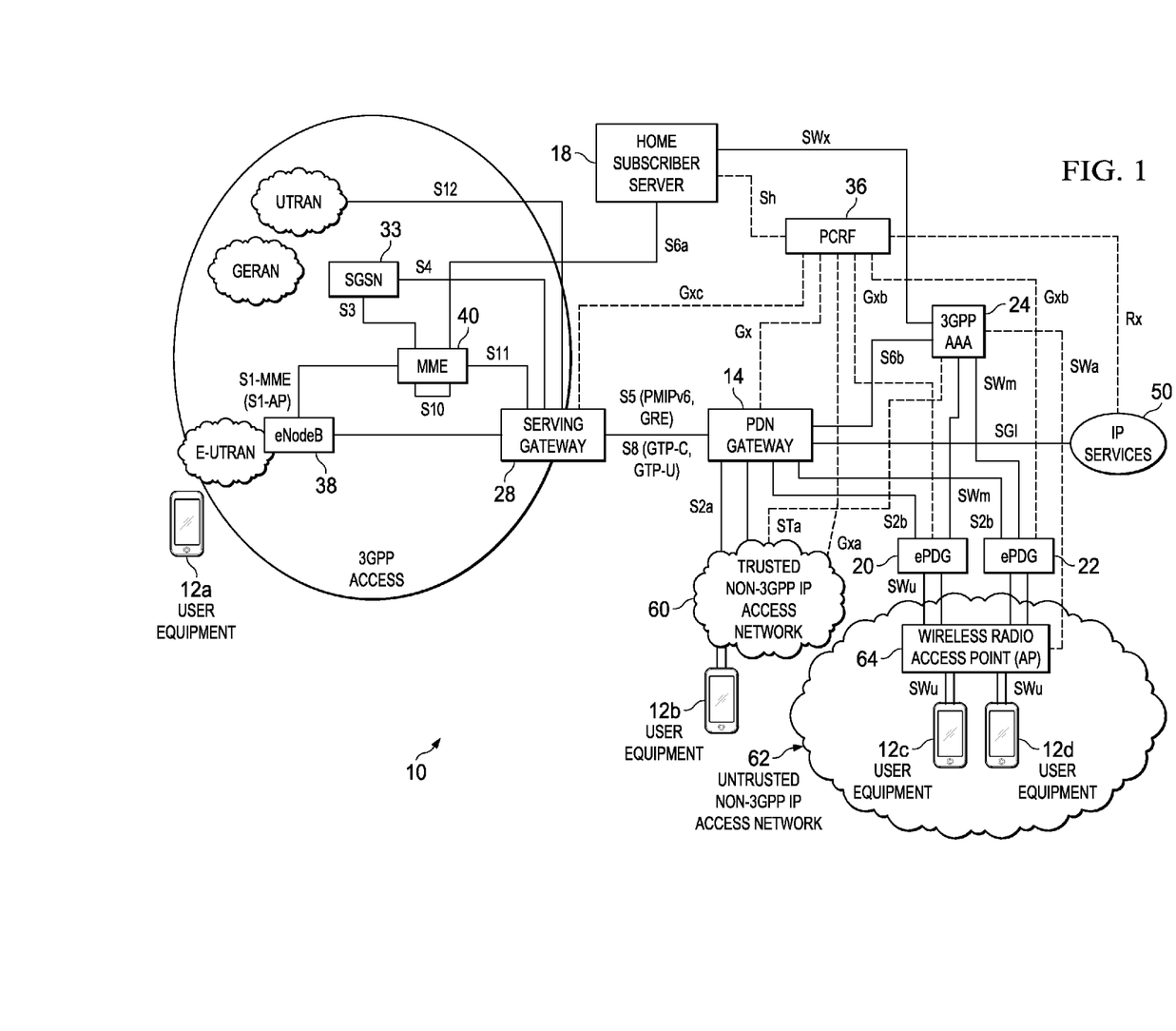
FIG. 1 is a simplified block diagram illustrating a communication system to facilitate providing error handling in an untrusted network environment according to one embodiment of the present disclosure.

Turning to FIG. 1, FIG. 1 is a simplified block diagram illustrating a communication system 10 to facilitate providing error handling in an untrusted network environment according to one embodiment of the present disclosure. This particular configuration may be tied to the 3rd Generation Partnership Project (3GPP) Evolved Packet System (EPS) architecture, also sometimes referred to as the Long-term Evolution (LTE) EPS architecture. Alternatively, the depicted architecture may be applicable to other environments equally.

The example architecture of FIG. 1 may include multiple end users operating user equipment (UE) 12a-12d and packet data network (PDN) gateway (PGW) 14, which may have a logical connection to a serving gateway (SGW) 28. Also provided are a home subscriber server (HSS) 18, a 3GPP Authentication, Authorization and Accounting (AAA) element 24, a serving General Packet Radio Service (GPRS) support node (SGSN) 33, an evolved packet data gateway (ePDG) 20, an ePDG 22 and a wireless radio access point (AP) 64. SGW 28 also has a logical connection to an evolved Node B (eNodeB) 38, a Mobility Management Entity (MME) 40 and to SGSN 33. Both SGW 28 and PGW 14 can interface with a Policy and Charging Rules Function (PCRF) 36. As used herein in this Specification, the terms 'user equipment,' 'user' and 'subscriber' are interchangeable.

Each of the elements of FIG. 1 may couple to one another through simple interfaces (as illustrated) or through any other suitable connection (wired or wireless), which provides a viable pathway for network communications. Additionally, any one or more of these elements may be combined or removed from the architecture based on particular configuration needs. For example, communication system 10 may include a configuration capable of transmission control protocol/Internet protocol (TCP/IP) communications for the transmission or reception of packets in a network. Communication system 10 may also operate in conjunction with a user datagram protocol/IP (UDP/IP) or any other suitable protocol where appropriate and based on particular needs.

In more general terms, 3GPP defines the Evolved Packet System (EPS) as specified in Technical Specification (TS) 23.401, TS 23.402, TS 29.274, etc. The EPS generally consists of UE access networks and an Evolved Packet Core (EPC). Access networks may be 3GPP access networks including legacy access networks such as GSM EDGE Radio Access Network (GERAN), universal mobile telecommunications systems (UMTS) Terrestrial Radio Access Network (UTRAN), also known as 3G, or LTE access networks such as Evolved UTRAN (E-UTRAN), also known as 4G/LTE or LTE-Advanced (LTE-A), or they may be non-3GPP IP access networks such as digital subscriber line (DSL), Cable, WiMAX, code division multiplex access (CDMA) 2000, WiFi, or the Internet.

Non-3GPP IP access networks can be included in communication system 10 and can divided into trusted and untrusted segments such as trusted non-3GPP IP access network 60 and untrusted non-3GPP IP access network 62, respectively. Note that the term 'trusted non-3GPP IP access network' (e.g., trusted non-3GPP IP access network 60) may be interchangeably referred to herein in this Specification using the term 'trusted IP access network'. Note further that the term 'untrusted non-3GPP IP access network' (e.g., untrusted non-3GPP IP access network 62) may be interchangeably referred to herein in this Specification using the terms 'untrusted IP access network', 'untrusted access network' and 'untrusted network'. Untrusted non-3GPP IP access network 62 may include wireless radio access point 64. Note wireless radio access point 64 may be referred to interchangeably in this Specification as a wireless access point (WAP) or access point (AP). Note further that the terms 'wireless' and 'WiFi' may be used interchangeably herein in this Specification.

Untrusted non-3GPP IP access network 62 may also provide Internet connectivity via AP 64 for UE connected thereto. In general, trusted IP access networks support mobility, policy and AAA interfaces to the EPC, whereas untrusted IP access networks do not. For trusted IP access network 60, a viable relationship exists between a service provider and the EPC. In contrast, access from untrusted non-3GPP IP access network 62 is managed via one or more ePDG(s) 20, 22 which may provide for Internet Protocol Security (IPsec) security associations to UE via untrusted non-3GPP IP access network 62 including wireless radio AP 64.

IPsec can use cryptographic security services to protect communications over IP networks. For example, communications over an internet or wireless local access network (WLAN) between UE 12a-12c and ePDG 20, PGW 14, etc. IPsec can support network-level peer authentication, data origin authentication, data integrity, data confidentiality (encryption), and replay protection. Implementation of IPsec can be based on Internet Engineering Task Force (IETF) standards.

As shown in FIG. 1, ePDG 20, 22 may each have a logical connection to PGW 14 through a corresponding S2b interface and to 3GPP AAA element 24 through a corresponding SWm interface to support mobility and AAA interfaces to the EPC. The SWm interface may provide an interface for authenticating and authorizing UE attaching to untrusted non-3GPP IP access network 62. In some instances when a PGW may not be present in the system, ePDG 20, 22 may have a logical connection to PCRF 36 through a DIAMETER-based Gxb interface, however, it should be noted that the Gxb interface is largely unused when a PGW (e.g., PGW 14) is present. UE 12c-12d (or any other UE seeking connection to the EPC) may interface with untrusted non-3GPP IP access network 62 and ePDG 20, 22 via wireless radio AP 64 over a corresponding SWu interface. In various embodiments, security for the SWu interface can be achieved using IPSec, Secure Sockets Layer (SSL), or any other secure tunnel. As shown in FIG. 1, ePDG 20, 22 may interface with wireless radio AP 64 through the SWu interface (e.g., via IPSec, SSL or any other secure tunnel) and wireless radio AP 64 may interface to UE (e.g., UE 12c and/or UE 12d) through the SWu interface.

In general, UE 12a-12d can be associated with clients or customers wishing to initiate a flow in communication system 10 via some network. The terms 'user equipment', 'mobile node', 'end user', 'and 'subscriber' are inclusive of devices used to initiate a communication, such as a computer, a personal digital assistant (PDA), a laptop or electronic notebook, a cellular telephone, an i-Phone®, i-Pad®, a Google® Droid® phone, an IP phone, or any other device, component, element, or object capable of initiating voice, audio, video, media, or data exchanges within communication system 10. UE 12a-12d may also be inclusive of a suitable interface to the human user such as a microphone, a display, a keyboard, or other terminal equipment. UE 12a-12d may also be any device that seeks to initiate a communication on behalf of another entity or element such as a program, a database, or any other component, device, element, or object capable of initiating an exchange within communication system 10. Data or information, as used herein in this Specification, refers to any type of numeric, voice, video, media, or script data or information, or any type of source or object code, or any other suitable information in any appropriate format that may be communicated from one point to another. In certain embodiments, UE 12a-12d may have a bundled subscription for network access and application services (e.g., voice, data), etc. IP addresses can be assigned using dynamic host configuration protocol (DHCP), Stateless Address Auto-configuration, default bearer activation, etc., or any suitable variation thereof.

Among other things, MME 40 may provide tracking area list management, idle mode UE tracking, bearer activation and deactivation, serving gateway and packet data network gateway selection for UEs and authentication services. As shown in FIG. 1, MME 40 may be in communication with SGSN 33, eNodeB 38, HSS 18 and SGW 28. In general, eNodeB 38 is responsible for selecting an MME for user equipment, managing radio resources, and making handover decisions for user equipment. HSS 18 may include one or more databases containing user-related and subscription-related information. HSS 18 may perform functionalities such as mobility management, call and session establishment support, user authentication and access authorization for 3GPP access. SGW 28 is a data plane element that can route and forward user data packets, while also acting as a mobility anchor for the user plane during inter-eNodeB handovers and as an anchor for mobility between LTE and other 3GPP technologies. SGW 28 may further be in communication with PGW 14.

PGW 14 may provide Internet protocol (IP) connectivity access network (IP-CAN) session connectivity for UEs to external packet data networks (PDNs), such as, for example, IP services 50. PGW 14 may also serve as policy enforcement points to manage QoS, online/offline flow-based charging, data generation, deep-packet inspection and intercept. SGSN 33 may provide access for legacy UMTS network devices. For example, UE on the GERAN can communicate through the SGSN to the SGW or the PGW, which can include a gateway GPRS support node (GGSN) to support communication with legacy systems.

PCRF 36 may be in communication with PGW 14, SGW 28, HSS 18, ePDG 20, 22, wireless radio AP 64, IP services 50 and trusted non-3GPP IP access network 60. PCRF 36 may aggregate information to and from the network, operational systems, and other sources in real-time, supporting the creation of policy charging and control (PCC) rules and then automatically making policy decisions for each subscriber such as, for example, quality of service (Qos) level decisions and charging rule decisions. PCRF 36 can be configured to use user-related and subscription-related information as a basis for the policy and charging control decisions. In some embodiments, PCRF 36 may determine PCC rules based on an application or service described to the PCRF from an application function (AF).

3GPP AAA element 24 is a network element responsible for accounting, authorization and authentication functions for UE 12a-12d. For AAA considerations, 3GPP AAA element 24 may provide a mobile node IP address and the accounting session identification (Acct-Session-ID) and other mobile node states in appropriate messaging (e.g., via access-Request/access-Response messages). Authentication refers to the process where an entity's identity is authenticated, typically by providing evidence that it holds a specific digital identity such as an identifier and the corresponding credentials. The authorization function determines whether a particular entity is authorized to perform a given activity, typically inherited from authentication when logging on to an application or service. Authorization may be determined based on a range of restrictions, for example time-of-day restrictions, or physical location restrictions, or restrictions against multiple accesses by the same entity or user. Accounting refers to the tracking of network resource consumption by users for the purpose of capacity and trend analysis, cost allocation, billing, etc. In various embodiments, communication system 10 may be provisioned with other AAA services and/or AAA servers, which may provide AAA considerations for the system.

In general terms, wireless radio AP 64 represents a radio access point device that can allow UEs to connect to a wired network using WiFi, Bluetooth™, WiMAX or any other appropriate standard. Hence, the broad term 'radio access point' can be inclusive of a WAP, a hotspot, a WiFi array, a wireless bridge (e.g., between networks sharing same SSID and radio channel), a WLAN or any other suitable access device, which may be capable of providing suitable connectivity to a given UE (e.g., UE 12c, UE 12d etc.). In certain cases, wireless radio AP 64 can connect to a router (via a wired network), which can relay data between UE 12c and other UEs of the network. In some embodiments, wireless radio AP 64 may be included in an automobile or other mobile transportation device to provide suitable connectivity to a given UE (e.g., UE 12c, etc.).

Also provided in the architecture of FIG. 1 is a series of interfaces, which can offer mobility, policy control, AAA functions and/or charging activities (offline and online) for various network elements. For example, interfaces can be used to exchange point of attachment, location, and/or access data for one or more end users, for example, users operating UE 12a-12d. Resource, accounting, location, access network information, network address translation (NAT) control, etc. can be exchanged using a remote authentication dial in user service (RADIUS) protocol or any other suitable protocol where appropriate. Other protocols that can be used in communication system 10 can include DIAMETER-based protocols, a service gateway interface (SGI), a terminal access controller access-control system (TACACS), TACACS+, Generic Route Encapsulation (GRE), etc.

As shown in FIG. 1, a DIAMETER-based interface, Rx, may be maintained between IP services 50 and PCRF 36 for communicating subscriber information between IP services 50 and PCRF 36. In various embodiments, IP services can include an IP multimedia subsystem (IMS) to provide IP multimedia services to subscribers. PCRF 36 may provision policy charging and control (PCC) rules for PGW 14 using a DIAMETER-based Gx interface and PGW 14 may communicate subscriber information to PCRF 36 over the Gx interface. Communication system 10 may be configured with additional DIAMETER-based interfaces to manage policy and control between various elements of the system 10.

For example, DIAMETER-based interfaces Gxa and Gxc may be maintained between the PCRF 36 and trusted IP access network 60 and SGW 28, respectively. Further DIAMETER-based interfaces may include SWx (interfacing AAA element 24 and the HSS 18), STa (interfacing AAA element 24 and a trusted non-3GPP IP access point (not shown)) and SWa (interfacing AAA element 24 and untrusted non-3GPP AP 64). Note the SWa interface may provide for interfacing with HSS 18 via AAA element 24. Various additional interfaces may include an S6a interface between HSS 18 and MME 40; an S6b interface between 3GPP AAA element 24 and PGW 14; an S2a interface between PGW 14 and trusted IP access network 60; corresponding S2b interfaces between PGW 14 and ePDG 20, 22; and corresponding DIAMETER based SWm interface between ePDG 20, 22 and 3GPP AAA element 24. The S2b interface may support protocols including Proxy Mobile IP version 6 (PMIPv6) or General Packet Radio Service (GPRS) Tunneling Protocol (GTP). Other signaling interfaces are illustrated between various components of FIG. 1, according to 3GPP standards, which are not discussed in detail for purposes of brevity.

Before detailing further operations and infrastructure of various elements of FIG. 1, certain contextual information is provided to offer an overview of some problems that may be encountered for error handling in an untrusted network environment. Such information is offered earnestly and for teaching purposes only and, therefore, should not be construed in a way to limit the broad applications for the present disclosure.

In untrusted non-3GPP wireless (e.g., WiFi) access networks, the interface between a given UE (e.g., UE 12c or UE 12d) and ePDG 20, 22 is an Internet Key Exchange version 2 (IKEv2) based SWu interface. IKEv2 may be used, among other things, to set-up a security association (SA) in IPSec for UE (e.g., UE 12c-12d) connecting to the EPC for a session (e.g., a call) via ePDG 20 or ePDG 22. IKEv2 may also be used in an IKE authentication (IKE_AUTH) exchange with the UE to provide for UE authentication using wireless Radio AP 64 and 3GPP AAA element 24 via an Extensible Authentication Protocol Authentication and Key Agreement (EAP-AKA) authentication.

Whenever there is any call rejection (for any reason) from the 3GPP AAA element/server the UE is typically informed with an 'AUTHENTICATION_FAILED/24' error type set for the 'Notify Message Type' in the NOTIFY payload of an IKE authentication response message. Note as referred to herein in this Specification an IKE authentication response message may be represented as 'IKE_AUTH_RESP'. Such operation is defined by the Internet Engineering Task Force according to RFC 5996. However, receiving a standard AUTHENTICATION_FAILED/24 error type can make UE behave in one manner for all possible DIAMETER errors that might occur for a 3GPP AAA server based rejection.

The DIAMETER errors can typically be categorized in the following categories: Protocol Errors (3xxx), Transient Errors (4xxx) and Permanent Errors (5xxx). In some cases, it might be useful for UE to determine what category of error has occurred. In some error cases it might be better to not try connecting to a same ePDG from which an error was received but rather try other alternatives; attempting to connect with the same ePDG may result in a call again being rejected by the same ePDG, which can lead to unnecessary signaling. However, for other error conditions, such as, for example, transient error conditions the UE may be required to again attempt the call to the same ePDG after a short interval of time.

As defined in RFC 5996, Sec. 2.21, only authentication failures such as AUTHENTICATION_FAILED and EAP failure, and malformed messages, such as INVALID_SYNTAX lead to a deletion of the IKE security association (SA) without requiring an explicit INFORMATIONAL exchange carrying a Delete payload. As further defined in Sec. 2.21 of RFC 5996, other errors may require such an exchange (e.g., an INFORMATIONAL exchange carrying a Delete payload) if policy dictates that it is needed. As defined in RFC 5996, Sec. 2.21.2 covering error handling in IKE_AUTH, all errors that occur in an IKE_AUTH exchange that cause the authentication to fail for any reason (e.g., invalid shared secret, invalid ID, untrusted certificate issuer, revoked or expired certificate, etc.) should result in an AUTHENTICATION_FAILED notification. As further defined in RFC 5996, Sec. 3.12, a Vendor identification (ID) payload may be sent as part of any message. Reception of a familiar Vendor ID payload can allow an implementation to make use of private use numbers (as described elsewhere in RFC 5996), such as private payloads, private exchanges, private notifications, etc. Unfamiliar Vendor IDs must be ignored.

RFC 5996 suggests that the AUTHENTICATION_FAILED error type does have special meaning, which can be used to indicate to UE that the IKE SA needs to be cleaned up. Further, RFC 5996 suggests that, to provide for backward compatibility, the Vendor ID payload can be used to provide new extensions to UE, since UE that may not support the new extensions can ignore the Vendor ID payload if it is not recognized.

In accordance with one embodiment, communication system 10 can overcome the aforementioned shortcomings (and others) by providing a solution that can include specifying special error types in a payload of an IKE_AUTH_RESP message, which can be used to trigger one or more appropriate actions or operations by a device (e.g., a given UE) based on an error type received. In various embodiments, the actions or operations can include the UE attempting to connect to a same ePDG from which an error was received after a predetermined time interval or attempting to connect with another ePDG before again attempting to connect to the same ePDG from which the error was received to provide for improved call connectivity rate. In general, the solution provided by communication system 10 utilize the IKEv2 protocol and address the network problem of a given UE repeatedly attempting to connect to a same ePDG from which an error was received and unknowingly loading the ePDG and the 3GPP AAA element with unnecessary signaling.

In various embodiments, the solution provided by communication system 10 can be provisioned using a first alternative that may include mapping different DIAMETER-based error codes received by ePDG 20 and/or ePDG 22 over the SWm interface from 3GPP AAA element 24 to private NOTIFY Error message types for Notify payloads that can be communicated by ePDG 20 and/or ePDG 22 over the SWu interface to UE 12c and/or 12d. In various embodiments, the solution provided by communication system 10 can be provisioned using a second alternative that may include mapping different DIAMETER-based error codes received by ePDG 20 and/or ePDG 22 over the SWm interface from 3GPP AAA element 24 to Vendor ID payloads that can be communicated by ePDG 20 and/or ePDG 22 over the SWu interface to UE 12c and/or 12d.

For the first alternative involving mapping different DIAMETER-based error codes to private NOTIFY Error message types, it is assumed that all UE vendors agree on the mapping and may treat the private NOTIFY Error type(s) as an AUTHENTICATION_FAILED error type (e.g., typically cleaning up of SA). This alternative may be referred to herein in this Specification as a 'Notify payload alternative'. In various embodiments, the private NOTIFY Error type(s) can further be used to trigger different UE behavior depending on different variants for the private NOTIFY Error type(s). In various embodiments, such different UE behavior can include indicating to the UE whether it should retry the authentication at a later time with the same ePDG from which the authentication error was received or whether it should retry the authentication with a different ePDG rather than one from which the authentication error was received.

For the second alternative involving the mapping different DIAMETER-based error codes to Vendor ID payloads, it is assumed that the Notify payload in the IKE_AUTH_RESP may be set to AUTHENTICATION_FAILED for the NOTIFY error type per standard RFC 5996 operation and the Vendor payload may be set to an ID indicating to the UE whether it should retry the authentication with the same ePDG from which the error was received at a later time or attempt the authentication with a different ePDG from which the error was received. Using the Vendor ID payload in the solution provide by communication system 10 may help to maintain backward compatibility for the solution, as UE which may have been deployed prior to the solution can ignore the Vendor ID payload. This alternative may be referred to herein in this Specification as a 'Vendor ID payload alternative'.

Table 1, shown below, illustrates example private SWu IKEv2 NOTIFY Error message types that can be used for the Notify payload alternative provided by communication system 10 involving mapping different DIAMETER-based error codes to private NOTIFY Error message types.

DIAMETER_DO_NOT_RETRY to trigger the UE to perform operations including, but not limited to, cleaning up its SA and attempting to connect to another ePDG different than the ePDG from which the error was received based on one or more local policies and/or a Domain Name Server (DNS) resolution before again trying to connect to the same ePDG from which the error was received. Error messages received over the SWm interface between ePDG 20, 22 and 3GPP

TABLE 1

| DIAMETER Error/ Result Code | DIAMETER Code Description | SWu IKEv2 NOTIFY Error type |
|---|---|---|
| 3001 | DIAMETER_COMMAND_UNSUPPORTED | DIAMETER_DO_NOT_RETRY |
| 3002 | DIAMETER_UNABLE_TO_DELIVER | DIAMETER_RETRY_LATER |
| 3003 | DIAMETER_REALM_NOT_SERVED | DIAMETER_DO_NOT_RETRY |
| 3004 | DIAMETER_TOO_BUSY | DIAMETER_RETRY_LATER |
| 3005 | DIAMETER_LOOP_DETECTED | DIAMETER_RETRY_LATER |
| 3006 | DIAMETER_REDIRECT_INDICATION | DIAMETER_RETRY_LATER |
| 3007 | DIAMETER_APPLICATION_UNSUPPORTED | DIAMETER_DO_NOT_RETRY |
| 3008 | DIAMETER_INVALID_HDR_BITS | DIAMETER_DO_NOT_RETRY |
| 3009 | DIAMETER_INVALID_AVP_BITS | DIAMETER_DO_NOT_RETRY |
| 3010 | DIAMETER_UNKNOWN_PEER | DIAMETER_DO_NOT_RETRY |
| 4001 | DIAMETER_AUTHENTICATION_REJECTED | DIAMETER_RETRY_LATER |
| 4002 | DIAMETER_OUT_OF_SPACE | DIAMETER_RETRY_LATER |
| 4003 | ELECTION_LOST | DIAMETER_RETRY_LATER |
| 5001 | DIAMETER_AVP_UNSUPPORTED | DIAMETER_DO_NOT_RETRY |
| 5002 | DIAMETER_UNKNOWN_SESSION_ID | DIAMETER_RETRY_LATER |
| 5003 | DIAMETER_AUTHORIZATION_REJECTED | DIAMETER_DO_NOT_RETRY |
| 5004 | DIAMETER_INVALID_AVP_VALUE | DIAMETER_DO_NOT_RETRY |
| 5005 | DIAMETER_MISSING_AVP | DIAMETER_DO_NOT_RETRY |
| 5006 | DIAMETER_RESOURCES_EXCEEDED | DIAMETER_RETRY_LATER |
| 5007 | DIAMETER_CONTRADICTING_AVPS | DIAMETER_DO_NOT_RETRY |
| 5008 | DIAMETER_AVP_NOT_ALLOWED | DIAMETER_DO_NOT_RETRY |
| 5009 | DIAMETER_AVP_OCCURS_TOO_MANY_TIMES | DIAMETER_DO_NOT_RETRY |
| 5010 | DIAMETER_NO_COMMON_APPLICATION | DIAMETER_DO_NOT_RETRY |
| 5011 | DIAMETER_UNSUPPORTED_VERSION | DIAMETER_DO_NOT_RETRY |
| 5012 | DIAMETER_UNABLE_TO_COMPLY | DIAMETER_DO_NOT_RETRY |
| 5013 | DIAMETER_INVALID_BIT_IN_HEADER | DIAMETER_DO_NOT_RETRY |
| 5014 | DIAMETER_INVALID_AVP_LENGTH | DIAMETER_DO_NOT_RETRY |
| 5015 | DIAMETER_INVALID_MESSAGE_LENGTH | DIAMETER_DO_NOT_RETRY |
| 5016 | DIAMETER_INVALID_AVP_BIT_COMBO | DIAMETER_DO_NOT_RETRY |
| 5017 | DIAMETER_NO_COMMON_SECURITY | DIAMETER_DO_NOT_RETRY |

Two example NOTIFY Error types are shown in TABLE 1, 'DIAMETER_DO_NOT_RETRY' and 'DIAMETER_RETRY_LATER', either of which can be sent on the SWu interface with UE 12c and/or UE 12d (or any other UE in untrusted non-3GPP IP access network 62). In various embodiments, one or more operations may be triggered by UE (e.g. UE 12c and/or UE 12d) receiving of one of the example NOTIFY Error types.

In various embodiments, a given UE (e.g., UE 12c and/or UE 12d) may interpret a NOTIFY Error message of a type DIAMETER_RETRY_LATER to trigger the UE to perform operations including, but not limited to, the UE cleaning up its SA and attempting to connect again to the same ePDG from which the error was received after a predetermined time interval, which may be configurable at the UE. In various embodiments, the predetermined time interval can be configured in a range from approximately 1 second to approximately 5 minutes, which can vary depending on operator requirements. In various embodiments, the UE cleaning up its SA can include the UE terminating the IPSec security association (SA) and WLAN session. Such operations that may be performed by the UE upon receiving this type of NOTIFY Error type may help to manage loading of ePDG 20, 22 and/or 3GPP AAA element 24 for transient and/or temporary errors.

In various embodiments, a given UE (e.g., UE 12c and/or UE 12d) may interpret a NOTIFY Error Message of a type AAA element 24 that may be mapped to a type 'DIAMETER_DO_NOT_RETRY' may be of a permanent nature, which may cause an increase in call rejection rate for ePDG 20 and/or ePDG 22 (whichever ePDG that may have communicated the NOTIFY Error type to a given UE). Thus, the operations that may be performed by UE upon receiving such an Error type can be used to manage loading between ePDG 20, 22 in communication system 10.

It should be noted that the NOTIFY Error types and corresponding names (e.g., DIAMETER_RETRY_LATER and DIAMETER_DO_NOT_RETRY) shown in TABLE 1 are provided for illustrative purposes only and are not meant to limit the broad scope of the present disclosure. It should be understood that other NOTIFY Error types and/or names could be configured for communication system 10 within the scope of the present disclosure. It should be noted that the Internet Assigned Numbers Authority (IANA) provides a range for private NOTIFY Error types from 8192-16383. Thus, from this range, in various embodiments, a first private error number or code may be selected to correspond to the DIAMETER_RETRY_LATER NOTIFY Error type and a second private error number or code may be selected to correspond to the DIAMETER_DO_NOT_RETRY NOTIFY Error type that can be configured for communication system 10.

As discussed above, communication system 10 may also provide a solution involving the use of Vendor ID payloads instead of private NOTIFY Error message types. For a Vendor ID payload alternative, equipment manufacturers, communication service providers (CSPs), and/or vendors of UE and ePDG devices may configure at least two new vendor IDs, which can be communicated to UE using a Vendor ID payload that can be included with an IKE_AUTH_RESP error message. In various embodiments, a first Vendor ID can be configured as a first error type, 'VENDORID_DIAMETER_DO_NOT_RETRY', which can be used to trigger operations by a given UE (e.g., UE 12c and/or UE 12d) similar to those described above for the NOTIFY Error type of DIAMETER_DO_NOT_RETRY. In a second Vendor ID can be configured as a second type, 'VENDORID_DIAMETER_RETRY_LATER', which can be used to trigger operations by a given UE (e.g., UE 12c and/or UE 12d) similar to those described above for the NOTIFY Error type of DIAMETER_RETRY_LATER. In various embodiments, a first Vendor ID error number or code can be selected to correspond to the VENDORID_DIAMETER_RETRY_LATER Vendor ID error type and a second Vendor ID error number or code can be selected to correspond to the VENDORID_DIAMETER_DO_NOT_RETRY Vendor ID error type.

In various embodiments, the Vendor ID payload alternative may include setting the NOTIFY Error type of a Notify payload to a standard AUTHENTICATION_FAILED Error type, as defined in RFC 5996. The addition of the Vendor ID payload may be used to provide intelligence to a given UE (e.g., UE 12c and/or UE 12d) to determine whether or not to again attempt to connect to the concerned ePDG from which the error was received in the immediate future (e.g., as may be determined using a configurable time interval, one or more local policies and/or a DNS based resolution).

Consider one operational example for the Notify payload alternative involving ePDG 20, 22, each of which may be configured with a SWm to SWu mapping as shown in TABLE 1, which may map DIAMETER Error/Result Codes to SWu IKEv2 NOTIFY Error types. During operation, say, for example, that UE 12c may attempt to connect to a first ePDG, say, for example, ePDG 20. During IKE authentication with 3GPP AAA element 24, ePDG 20 may, in one instance, receive a DIAMETER-based Error/Result Code of DIAMETER_UNABLE_TO_DELIVER/3002 over the SWm interface from 3GPP AAA element 24. Based on the mapping shown in TABLE 1, ePDG 20 may determine that the Error/Result Code corresponds to a SWu IKEv2 NOTIFY Error type of DIAMETER_RETRY_LATER, which ePDG 20 may communicate to UE 12c over the SWu interface in the Notify payload of an IKE_AUTH_RESP message.

It is assumed for the present example that UE 12c is configured to interpret the NOTIFY Error types shown in TABLE 1 to perform one or more operations, as discussed above, corresponding to a NOTIFY Error type that may be received. Thus, UE 12c may receive the NOTIFY Error type of DIAMETER_RETRY_LATER in the Notify payload of the IKE_AUTH_RESP message and may determine, based on the Error type, to clean-up its SA for corresponding ePDG 20 and attempt to connect to ePDG again after a predetermined time interval configured for the UE.

Consider in another instance that ePDG 20 may receive a DIAMETER-based Error/Result Code of DIAMETER_INVALID_MESSAGE_LENGTH/5015 over the SWm interface from 3GPP AAA element 24. Based on the mapping shown in TABLE 1, ePDG 20 may determine that the Error/Result Code corresponds to a SWu IKEv2 NOTIFY Error type of DIAMETER_DO_NOT_RETRY, which ePDG 20 may communicate to UE 12c over the SWu interface in the Notify payload of an IKE_AUTH_RESP message. UE 12c may receive the NOTIFY Error type of DIAMETER_DO_NOT_RETRY in the Notify payload of the IKE_AUTH_RESP message and may determine, based on the Error type, to clean-up its SA for corresponding ePDG 20 and to attempt to connect to another ePDG, say, for example ePDG 22 before again attempting to connect to ePDG 20. It should be understood that the operations described for UE 12c can be configured for UE 12d or any other UE (e.g., UE 12a-12b) in communication system 10.

Although the above operational example is provided with respect to the Notify payload alternative, it should be understood that the operations described above (e.g., for ePDG 20, 22, UE 12c and/or UE 12d, and 3GPP AAA element 24) can also be performed in a similar manner for the Vendor ID payload alternative in which Vendor IDs can be configured for a VENDORID_DIAMETER_DO_NOT_RETRY error type and a VENDORID_DIAMETER_RETRY_LATER error type as discussed herein in this Specification.

Accordingly, the solution provided by communication system 10 may provide for several advantages over current error handling mechanisms, including, but not limited to, enabling efficient signaling over the network to reduce chances of overloading ePDG(s) and/or the 3GPP AAA element/server that can otherwise be caused by a given UE repeatedly attempting to connect to a same ePDG in case of permanent failures. For temporary failures, the solution provided by communication system 10 may provide a given UE with knowledge of transient SWm errors. Based on this knowledge, the UE can attempt to connect with a same ePDG from which the error was received after some predetermined short time interval, which can lead to improved network management. Further, the solution provided by communication system 10 may not introduce any additional signaling by utilizing the existing IKEv2 protocol. The solution provided by communication system 10 may also reduce unnecessary signaling that can be caused by repeated attempts to connect to an ePDG that can otherwise occur for permanent error types due to current error handling mechanisms in current network deployments. Thus, the solution provided by communication system 10 may provide for better call connectivity rates for devices in comparison to current network deployments.

The solution provided by communication system 10 also addresses backward compatibility and provides two approaches/alternatives (e.g., vendor ID payload usage or NOTIFY error type) which can help CSPs to choose between the two alternatives based on agreements with device/equipment vendors. The solution provided by communication system 10 may also be useful in a virtual EPC (vEPC) network environment where there may be many ePDG to connect to, in which case providing the option for attempting to connect to other ePDG(s) for permanent failures may provide for improved network management. In various embodiments, the solution provided by communication system 10 may also be useful in cases where selection of an ePDG may be statically configured for a given UE. In such embodiments, the UE can be configured to wait a predetermined time interval before attempting to connect again to the ePDG based on what kind of failure may have occurred on the SWm interface.

Figure 2A:
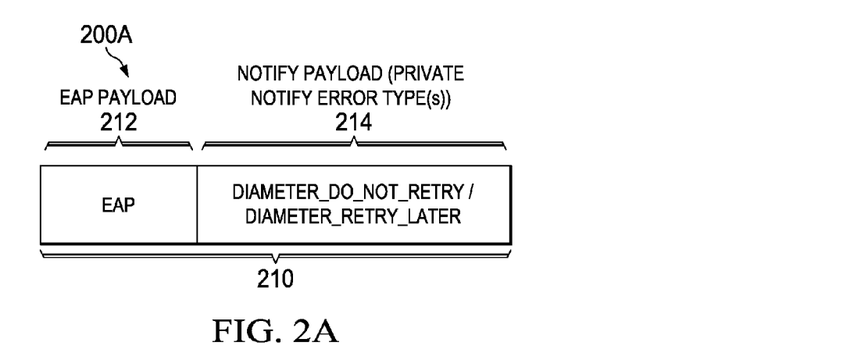
FIGS. 2A-2B are simplified schematic diagrams illustrating details associated with example messages that can be used in various potential embodiments of the communication system.
Figure 2B:
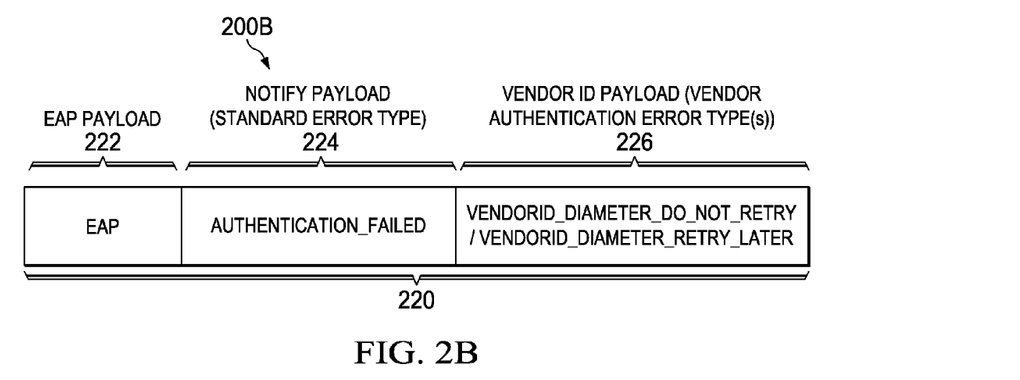

Turning to FIGS. 2A-2B, FIGS. 2A-2B are simplified schematic diagrams 200A-200B illustrating details associated with example IKE_AUTH_RESP messages that can be used in various potential embodiments of the communication system. FIG. 2A illustrates an example IKE_AUTH_RESP message 210 that may be associated with the Notify payload alternative of the solution provided by communication system 10 in various embodiments. FIG. 2B illustrates an example IKE_AUTH_RESP message 220 that may be associated with the Vendor ID payload alternative of the solution provided by communication system 10 in various embodiments.

As shown in FIG. 2A, IKE_AUTH_RESP message 210 may include an EAP payload 212 and a Notify payload 214. In various embodiments, Notify payload 214 may be set to an NOTIFY Error type of DIAMETER_DO_NOT_RETRY or DIAMETER_RETRY_LATER based on a DIAMETER-based error that may be received by ePDG 20 and/or ePDG 22, depending on use case, from 3GPP AAA element 24 via the corresponding SWm interface for a given UE (e.g., UE 12c-12d) attempting to connect to a corresponding ePDG 20, 22. In various embodiments, the NOTIFY Error type can be set based on a mapping of DIAMETER Error/Result code(s) to private IKEv2 NOTIFY Error type(s), which can be configured for ePDG 20, 22.

As shown in FIG. 2B, IKE_AUTH_RESP message 220 may include an EAP payload 222, a Notify payload 224 and a Vendor ID Payload 226. For the Vendor ID alternative of the solution provided by communication system 10, Notify payload 224 of IKE_AUTH_RESP message 220 may be set to a standard NOTIFY error type of AUTHENTICATION_FAILED. In various embodiments, Vendor ID payload 224 may be set to a Vendor ID Error type of VENDORID_DIAMETER_DO_NOT_RETRY or VENDORID_DIAMETER_RETRY_LATER a DIAMETER-based error that may be received by ePDG 20 and/or ePDG 22, depending on use case, from 3GPP AAA element 24 via the corresponding SWm interface for a given UE (e.g., UE 12c-12d) attempting to connect to a corresponding ePDG 20, 22. In various embodiments, the Vendor ID Error type can be set based on a mapping of DIAMETER Error/Result code(s) to IKEv2 Vendor ID Error type(s), which can be configured for ePDG 20, 22.

Figure 3:
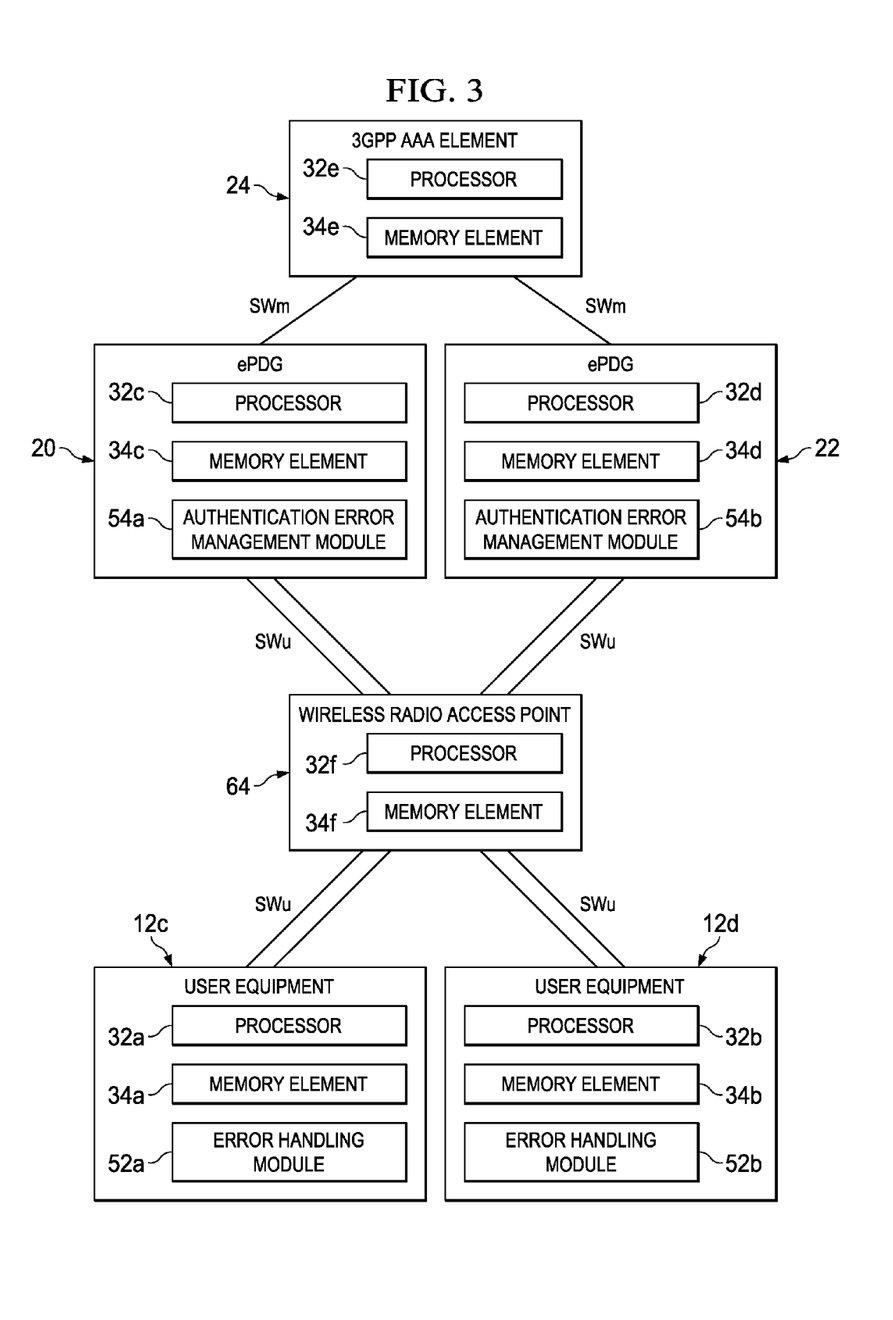
FIG. 3 is a simplified block diagram illustrating additional details associated with one potential embodiment of the communication system.

Turning to FIG. 3, FIG. 3 is simplified block diagrams illustrating additional details associated with one potential embodiment of communication system 10. FIG. 3 includes UE 12c, UE 12d, ePDG 20, ePDG 22, 3GPP AAA element 24 and wireless radio AP 64 of communication system 10. Each of these elements may include a respective processor 32a-32f and a respective memory element 34a-34f. As shown in FIG. 3, ePDG 20 may further include an authentication error management module 54a and ePDG 22 may further include an authentication error management module.

In various embodiments, each ePDG 20, 22 may be provisioned and/or configured with one or more mappings, each which can be used to map DIAMETER-based Error/Result codes that may be received via the SWm interface with 3GPP AAA element 24 to IKEv2 Error Types. In various embodiments, the IKEv2 Error types can be mapped to NOTIFY Error types or Vendor ID error types, depending on implementation. As noted, private IKEv2 NOTIFY Error types can be included in a Notify payload of an IKE_AUTH_RESP message that can be communicated over the SWu interface from a given ePDG to a given UE attempting to connect to the ePDG and Vendor ID Error types can be included in a Vendor ID payload of an IKE_AUTH_RESP messages that can be communicated over the SWu interface from a given ePDG to a given UE attempting to connect to the ePDG. In various embodiments, the mapping(s) can be provisioned in each respective memory element 34c-34d for each respective ePDG 20, 22 and/or can be provisioned in each respective authentication error management module 54a-54b for each respective ePDG 20, 22. In various embodiments, the mappings can also be provisioned in one or more databases, combination thereof or the like that may be provisioned in each ePDG 20, 22, which can overlap or be included with each respective memory element 34c-34d and/or each respective authentication error management module 54a-54b.

Further shown in FIG. 3, each UE 12c-12d may further be provisioned and/or configured with a respective error handling module 52a-52b. In various embodiments, the respective error handling modules 52a-52b for each respective UE 12c-12d may be provisioned and/or configured, depending on implementation, with functionality to parse private NOTIFY Error types from the Notify payload of an IKE_AUTH_RESP message and/or Vendor ID Error types from the Vendor ID payload of an IKE_AUTH_RESP message. In various embodiments, each UE 12c-12d, via each respective error handling module 52a-52b, may be provisioned and/or configured, depending on implementation, with functionality to perform one or more actions and/or operations based on an Error type parsed from a corresponding payload of an IKE_AUTH_RESP message.

In various embodiments, UE actions and/or operations can include, but not be limited to, a given UE cleaning up its SA and attempting to retry a connection with a same ePDG from which an error was received after a predetermined period of time (e.g., for temporary type errors such as, for example DIAMETER_RETRY_LATER or VENDORID_DIAMETER_RETRY_LATER). In various embodiments, the predetermined period of time can be configured for each UE 12c-12d via each corresponding error handling module 52a-52b, memory element 34a-34b, database, combination thereof or the like. In various embodiments, UE actions and/or operations can include, but not be limited to, a given UE cleaning up its SA and attempting to connect to another ePDG different than the ePDG from which an error was received before attempting again to connect to the same ePDG from which the error was received (e.g., for permanent type errors, such as, for example, DIAMETER_DO_NOT_RETRY or VENDORID_DIAMETER_DO_NOT_RETRY). In various embodiments, the behavior (e.g., intelligence), which may dictate to the UE which ePDG to try and connect to can be provisioned via one or more policies and/or DNS response(s). In various embodiments, the one or more policies and/or DNS response(s) can be statically or dynamically provisioned for and/or communicated to each UE 12c-12d via each respective memory element 34a-34b, each respective error management module 52a-52b, each of a respective database that can be included in each respective UE 12c-12d, combinations thereof and/or the like.

Hence, appropriate software and/or hardware is being provisioned in UE 12c, UE 12d, ePDG 20, 22, 3GPP AAA element 24 and wireless radio AP 64 in order to facilitate providing error handling in an untrusted IP access network of communication system 10. Note that in certain examples, certain databases can be consolidated with memory elements (or vice versa), or the storage can overlap/exist in any other suitable manner.

In one example implementation, ePDG 20, 22, 3GPP AAA element 24 and wireless radio AP 64 are network elements, which are meant to encompass network appliances, servers, routers, switches, gateways, bridges, load balancers, firewalls, processors, modules, or any other suitable device, component, element, or object operable to exchange information that facilitates or otherwise helps to provide for error handling (e.g., for a network as illustrated in FIG. 1). In other embodiments, these operations and/or features may be provided external to these elements and/or UE 12c-12d, or included in some other network device to achieve this intended functionality. Alternatively, one or more of these elements and/or UE 12c-12d can include software (or reciprocating software) that can coordinate in order to achieve the operations and/or features, as outlined herein. In still other embodiments, one or more of these devices and/or UE 12c-12d may include any suitable algorithms, hardware, software, components, modules, interfaces, or objects that facilitate the operations thereof. This may be inclusive of appropriate algorithms and communication protocols that allow for the effective exchange of data or information. In some embodiments, DIAMETER routing agents (DRAs) may interface between network elements in order to provide DIAMETER routing procedures for DIAMETER-based messages.

In regards to the internal structure associated with communication system 10, each of UE 12c, UE 12d, ePDG 20, 22, 3GPP AAA element 24 and wireless radio AP 64 can include memory elements for storing information to be used in achieving the error handling activities, as outlined herein. Additionally, each of these devices may include a processor that can execute software or an algorithm to perform the error handling activities as discussed in this Specification. These devices may further keep information in any suitable memory element [e.g., random access memory (RAM), read only memory (ROM), an erasable programmable read only memory (EPROM), application specific integrated circuit (ASIC), etc.], software, hardware, or in any other suitable component, device, element, or object where appropriate and based on particular needs. Any of the memory items discussed herein should be construed as being encompassed within the broad term 'memory element'.

In various embodiments, information being tracked or sent to UE 12c, UE 12d, ePDG 20, 22, 3GPP AAA element 24 and/or wireless radio AP 64 could be provided in any database, register, control list, cache, or storage structure: all of which can be referenced at any suitable timeframe. Any such storage options may be included within the broad term 'memory element' as used herein. Similarly, any of the potential processing elements, modules, and machines described herein should be construed as being encompassed within the broad term 'processor'. Each of the network elements and/or user equipment (e.g., mobile nodes) can also include suitable interfaces for receiving, transmitting, and/or otherwise communicating data or information in a network environment.

Note that in certain example implementations, the error handling techniques as outlined herein may be implemented by logic encoded in one or more tangible media, which may be inclusive of non-transitory media (e.g., embedded logic provided in an ASIC, in digital signal processing (DSP) instructions, software [potentially inclusive of object code and source code] to be executed by a processor, or other similar machine, etc.). In some of these instances, memory elements [as shown in FIG. 3] can store data or information used for the operations described herein. This includes the memory elements being able to store software, logic, code, or processor instructions that are executed to carry out the activities described herein.

A processor can execute any type of instructions associated with the data or information to achieve the operations detailed herein. In one example, the processors [as shown in FIG. 3] could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), a DSP processor, an EPROM, an electrically erasable PROM (EEPROM)) or an ASIC that includes digital logic, software, code, electronic instructions, or any suitable combination thereof.

Figure 4:
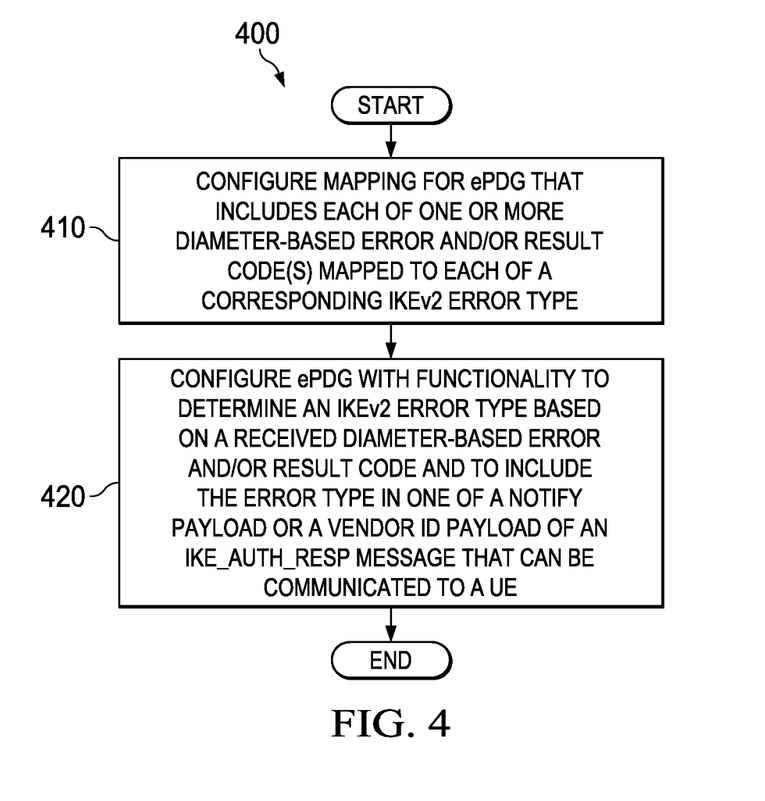
FIG. 4 is a simplified flow diagram illustrating example operations associated with configuring an evolved packet data gateway to provide for error handling in accordance with one potential embodiment of the communication system.

Turning to FIG. 4, FIG. 4 is a simplified flow diagram illustrating example operations associated with configuring a given ePDG to provide for error handling in accordance with one potential embodiment of communication system 10. In various embodiments, these operations may be carried out using ePDG 20 and/or ePDG 22.

At 410 a mapping may be configured for ePDG 20 and/or ePDG 22 that includes each of one or more DIAMETER-based Error/Result code(s) mapped to each of one or more corresponding IKEv2 Error types. In various embodiments, depending on implementation, these error types can by private IKEv2 NOTIFY Error types or can be IKEv2 Vendor ID Error Types, which can be specified by equipment manufacturers, vendors, CSPs, combinations thereof or the like. At 420, ePDG 20 and/or ePDG 22 can be configured with functionality that can be used 1) to determine a corresponding IKEv2 Error type based on a received DIAMETER-based Error/Result Code received over an SWm interface and 2) to include the determined IKEv2 Error type in one of a Notify payload or a Vendor ID payload of an IKE_AUTH_RESP message that can be communicated to a given UE over an SWu interface with the UE.

Figure 5:
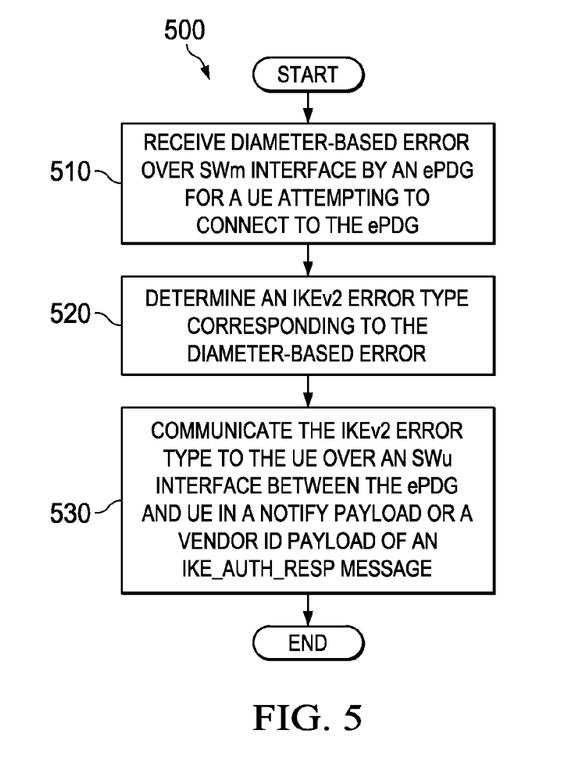
FIG. 5 is a simplified flow diagram illustrating example operations associated with providing error handling in an untrusted network environment in accordance with one potential embodiment of the communication system.

Turning to FIG. 5, FIG. 5 is a simplified flow diagram 500 illustrating example operations associated with error handling operations that can be performed by a particular ePDG in an untrusted network in one example embodiment of communication system 10. In one example embodiment, these operations may be carried out using ePDG 20 and/or ePDG 22 and 3GPP AAA element 24.

At any given time, a given UE (e.g., UE 12c and/or UE 12d) may seek to initiate connectivity with a given ePDG (e.g., ePDG 20, 22) to initiate a session/connection with the EPC through untrusted non-3GPP IP access network 62 via wireless radio AP 64. Consider for the present example that a particular UE, say, for example, UE 12c, seeks to connect with a particular ePDG, say, for example, ePDG 20, through an EAP authentication exchange via ePDG 20 and 3GPP AAA element 24. Consider further for the present example that an error occurs for the authentication. It is assumed for purposes of the present example that the operations described below may be carried out using ePDG 20 and UE 12c; however, it should be understood that these operations can be applied in a similar manner using ePDG 22 and/or ePDG 22 and UE 12d.

Processing may start at 510 when ePDG 20 may receive a DIAMETER-based error over the SWm interface for UE 12c attempting to connect to the ePDG. At 520, ePDG 20 may determine an IKEv2 Error type corresponding to the received DIAMETER-based error. It is assumed for purposes of the present example that each ePDG 20, 22 may be configured with a mapping of DIAMETER-based error(s) to IKEv2 Error types. In various embodiments, the IKEv2 Error types can be NOTIFY Error type(s), which can be included in a Notify payload of an IKE_AUTH_RESP message, or can be Vendor ID Error type(s), which can be included in a Vendor ID payload of an IKE_AUTH_RESP message.

At 530, ePDG 20 may communicate the IKEv2 Error type to the UE over the SWu interface between the ePDG and the UE in either a Notify payload or a Vendor ID payload, depending on implementation, of an IKE_AUTH_RESP message.

Figure 6:
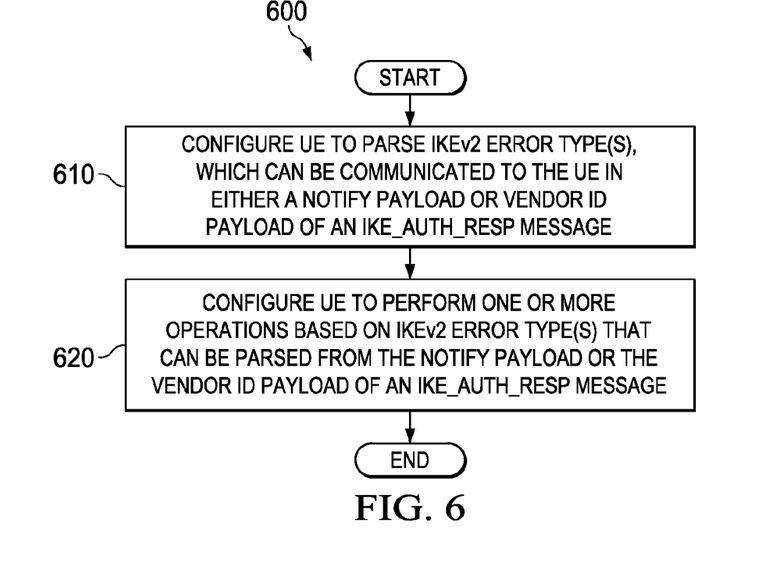
FIG. 6 is a simplified flow diagram illustrating example operations associated with configuring a user equipment to provide for error handling in an untrusted network environment in accordance with one potential embodiment of the communication system.

Turning to FIG. 6, FIG. 6 is a simplified flow diagram 600 illustrating example operations associated with configuring a given UE to provide for error handling in an untrusted network environment. In various embodiments, these operations may be carried out using UE 12*c* and/or UE 12*d*; however, it should be understood that these operations can be applied in a similar manner to any UE (e.g., UE 12*a*-12*b*).

At 610, a given UE may be configured to parse one or more IKEv2 Error type(s), which can be communicated to the UE in a Notify payload or a Vendor ID payload of an IKE_AUTH_RESP message. At 620, the UE can be configured to perform one or more actions and/or operations based on IKEv2 Error type(s) that can be parsed from the Notify payload or a Vendor ID payload of an IKE_AUTH_RESP message. In various embodiments, UE actions and/or operations can include, but not be limited to, a given UE cleaning up its SA and attempting to retry a connection with a same ePDG from which an error was received after a predetermined period of time (e.g., for temporary type errors). In various embodiments, the predetermined period of time can also be configured for UE. In various embodiments, UE actions and/or operations can include, but not be limited to, a given UE cleaning up its SA and attempting to connect to another ePDG different than the ePDG from which an error was received before attempting again to connect to the same ePDG from which the error was received (e.g., for permanent type errors).

Figure 7:
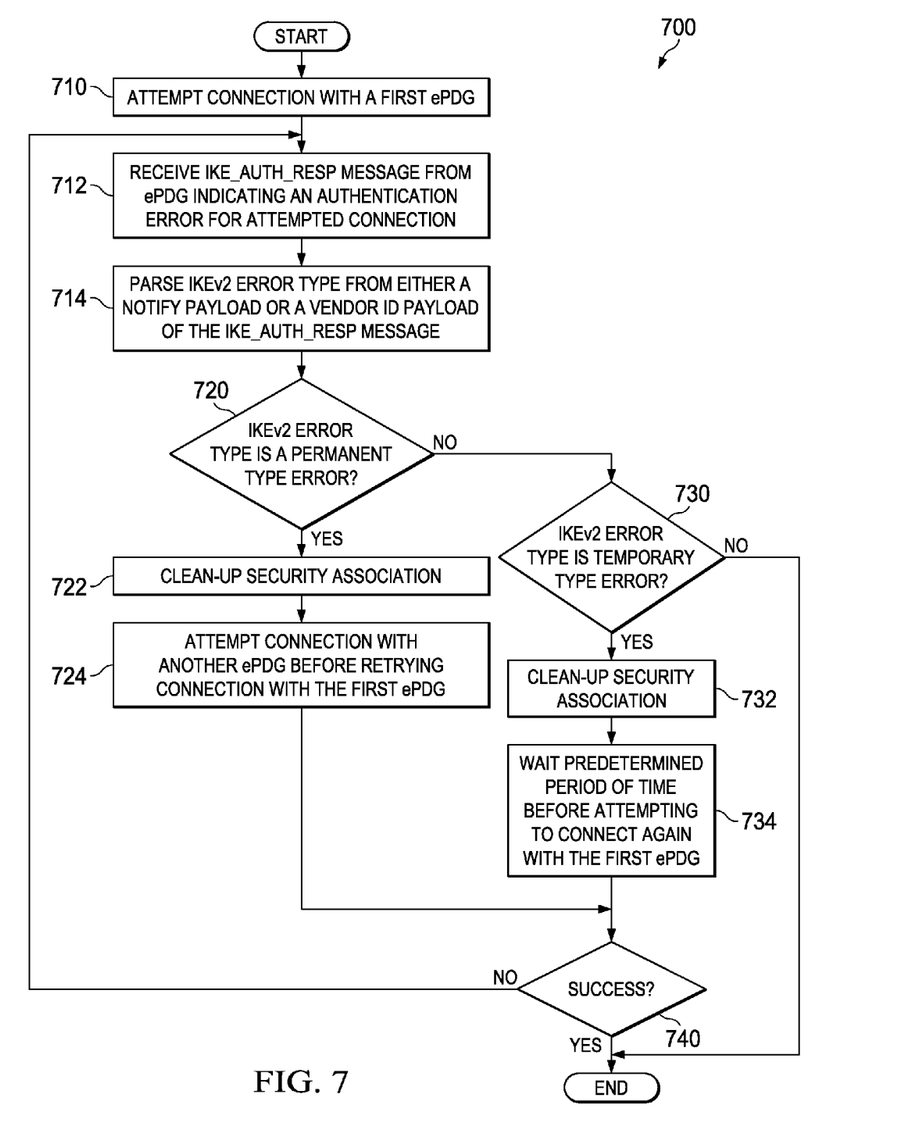
FIG. 7 is a simplified flow diagram illustrating other example operations associated with providing error handling in an untrusted network environment in accordance with one potential embodiment of the communication system.

Turning to FIG. 7, FIG. 7 is a simplified flow diagram 700 illustrating example operations associated with error handling operations that can be performed by a particular UE in an untrusted network in one example embodiment of communication system 10. In one example embodiment, these operations may be carried out using UE 12*c* and/or UE 12*d* and ePDG 20 and/or ePDG 22. Note for the present example, it is assumed that each ePDG 20, 22 have been configured with a mapping of DIAMETER-based Error/Result Code(s) to IKEv2 Error type(s). In various embodiments, depending on implementation, the IKEv2 Error type(s) can be private IKEv2 NOTIFY Error type(s), which can be included in a Notify payload of an IKE_AUTH_RESP message, or can be IKEv2 Vendor ID Error type(s), which can be included in a Vendor ID payload of an IKE_AUTH_RESP message. It is further assumed for the present example that each UE 12*c*-UE 12*d* may be configured, depending on implementation, to parse the configured IKEv2 Error types from either the Notify payload or the Vendor ID payload of an IKE_AUTH_RESP message. It should be understood that the example operations illustrated in FIG. 7 can be applied to both the Notify payload alternative and the Vendor ID payload alternative of the solution provided by communication system 10.

At any given time, a given UE (e.g., UE 12*c* and/or UE 12*d*) may seek to initiate connectivity with a given ePDG (e.g., ePDG 20, 22) to initiate a session/connection with the EPC through untrusted non-3GPP IP access network 62 via wireless radio AP 64. Consider for the present example that a particular UE, say, for example, UE 12*d*, seeks to connect with a particular ePDG, say, for example, ePDG 20, through an EAP authentication exchange via ePDG 20 and 3GPP AAA element 24. Consider further for the present example that an error occurs for the authentication. It is assumed for purposes of the present example that the operations described below may be carried out using ePDG 20 and UE 12*d*; however, it should be understood that these operations can be applied in a similar manner using ePDG 22 and/or ePDG 20 and UE 12*c*.

Thus, processing may start at 710 where UE 12*d* may seek a connection with a first ePDG (e.g., ePDG 20). At 712, UE 12*d* may receive an IKE_AUTH_RESP message from first ePDG 20 indicating an authentication error for the attempted connection. At 714, UE 12*d* may, depending on implementation, parse an IKEv2 Error type from either a Notify payload or a Vendor ID payload of the IKE_AUTH_RESP message.

At 720, UE 12*d* may determine if the IKEv2 Error type is a permanent type of error (e.g., DIAMETER_DO_NOT_RETRY or VENDORID_DIAMETER_DO_NOT_RETRY). If so, UE 12*d* may clean up its security association (SA) at 722. At 724, UE 12*d* may attempt a connection with another ePDG (e.g., ePDG 22) before retrying a connection with first ePDG 20. At 740, UE 12*d* may determine if the previous operations were successful, for example, whether UE 12*d* was able to connect to ePDG 22 or first ePDG 20 as a fallback. If so, the operations may end. If the operations were not a success, UE 12*d* may continue to process IKEv2 Error type(s) that may be received from a given ePDG (e.g., return to 712 and re-process the received error(s)).

If, at 720, UE 12*d* determines that the IKEv2 Error type is not a permanent type of error, then at 730 UE 12*d* may determine if the IKEv2 Error type is a temporary type of error (e.g., DIAMETER_RETRY_LATER or VENDORID_DIAMETER_RETRY_LATER). If so, UE 12*d* may clean up its security association (SA) at 732. At 734, UE 12*d* may wait a predetermined period of time before attempting to connect again with first ePDG 20. At 740, UE 12*d* may determine if the previous operations were successful, for example, whether UE 12*d* was able to connect to first ePDG 20. If so, the operations may end. If the operations were not a success, UE 12*d* may continue to process IKEv2 Error type(s) that may be received from a given ePDG (e.g., return to 712 and re-process the received error(s)).

Note that with the examples provided above, as well as numerous other examples provided herein, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that communication system 10 (and its teachings) are readily scalable and can accommodate a large number of components, as well as more complicated/sophisticated arrangements and configurations. Accordingly, the examples provided should not limit the scope or inhibit the broad teachings of communication system 10 as potentially applied to a myriad of other architectures.

It is also important to note that the steps in the appended diagrams illustrate only some of the possible signaling scenarios and patterns that may be executed by, or within, communication system 10. Some of these steps may be deleted or removed where appropriate, or these steps may be modified or changed considerably without departing from the scope of teachings provided herein. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication system 10 in that any suitable arrangements, chronologies, configurations, and timing mechanisms may be provided without departing from the teachings provided herein.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method comprising:
receiving an error message by a user equipment (UE) from a first gateway over an SWu interface indicating an authentication error with the first gateway;
determining, by the UE, an error type as a permanent type error or a temporary type error for the error message;
cleaning up, by the UE, a security association for the first gateway, wherein the cleaning up comprises the UE terminating an Internet Protocol Security (IPSec) security association for the first gateway and the UE terminating a session with the first gateway; and
attempting a connection again with the first gateway or with another gateway based on whether the error type is a permanent type error or a temporary type error.

2. The method of claim 1, wherein the error message is an Internet Key Exchange version 2 (IKEv2) authentication response (IKE_AUTH_RESP) message received by the UE, which is communicated from the first gateway.

3. The method of claim 2, further comprising:
parsing the error type from a notify payload of the IKE_AUTH_RESP message by the UE.

4. The method of claim 2, further comprising:
parsing the error type from a vendor ID payload of the IKE_AUTH_RESP message by the UE.

5. The method of claim 4, wherein the IKE_AUTH_RESP message includes a standard error type in a notify payload of the message.

6. The method of claim 1, wherein the first gateway or the other gateway are an evolved packet data gateway (ePDG).

7. The method of claim 1, wherein if the error type is a permanent type error, the attempting includes attempting a connection with the other gateway before attempting another connection with the first gateway.

8. The method of claim 1, wherein if the error type is a temporary type error, the attempting includes attempting another connection with the first gateway after a predetermined period of time.

9. One or more non-transitory tangible media encoding logic that includes instructions for execution that when executed by a processor, is operable to perform operations comprising:
receiving an error message by a user equipment (UE) from a first gateway over an SWu interface indicating an authentication error with the first gateway;
determining, by the UE, an error type as a permanent type error or a temporary type error for the error message;
cleaning up, by the UE, a security association for the first gateway, wherein the cleaning up comprises the UE terminating an Internet Protocol Security (IPSec) security association for the first gateway and the UE terminating a session with the first gateway; and
attempting a connection again with the first gateway or with another gateway based on whether the error type is a permanent type error or a temporary type error.

10. The media of claim 9, wherein the error message is an Internet Key Exchange version 2 (IKEv2) authentication response (IKE_AUTH_RESP) message received by the UE, which is communicated from the first gateway.

11. The media of claim 10, the operations further comprising:
parsing the error type from a notify payload of the IKE_AUTH_RESP message by the UE.

12. The media of claim 10, the operations further comprising:
parsing the error type from a vendor identification (ID) payload of the IKE_AUTH_RESP message by the UE.

13. The media of claim 12, wherein the IKE_AUTH_RESP message includes a standard error type in a notify payload of the message.

14. The media of claim 9 wherein if the error type is a permanent type error, the attempting includes attempting a connection with the other gateway before attempting another connection with the first gateway.

15. The media of claim 9, wherein if the error type is a temporary type error, the attempting includes attempting another connection with the first gateway after a predetermined period of time.

16. A user equipment (UE), comprising:
a memory element for storing data; and
a processor that executes instructions associated with the data, wherein the processor and the memory element cooperate such that the UE is configured for:
receiving an error message from a first gateway over an SWu interface indicating an authentication error with the first gateway;
determining an error type as a permanent type error or a temporary type error for the error message;
cleaning up a security association for the first gateway, wherein the cleaning up comprises terminating an Internet Protocol Security (IPSec) security association for the first gateway and the UE terminating a session with the first gateway; and
attempting a connection again with the first gateway or with another gateway based on whether the error type is a permanent type error or a temporary type error.

17. The UE of claim 16, wherein the UE is further configured for:
parsing the error type from a notify payload of an Internet Key Exchange version 2 (IKEv2) authentication response (IKE_AUTH_RESP) message.

18. The UE of claim 16, wherein the UE is further configured for:
parsing the error type from a vendor identification (ID) payload of an Internet Key Exchange version 2 (IKEv2) authentication response (IKE_AUTH_RESP) message.

19. The UE of claim 16, wherein if the error type is a permanent type error, the attempting includes attempting a connection with the other gateway before attempting another connection with the first gateway.

20. The UE of claim 16, wherein if the error type is a temporary type error, the attempting includes attempting another connection with the first gateway after a predetermined period of time.

\* \* \* \* \*